(12) United States Patent
Vierich et al.

(10) Patent No.: US 7,243,106 B2
(45) Date of Patent: Jul. 10, 2007

(54) STATIC DRILL-THROUGH MODELLING

(75) Inventors: Ralf Vierich, Kanata (CA); Charles Mike Potter, Nepean (CA)

(73) Assignee: Cognos Incorporated, Ottawa, Ontario (CA)

( * ) Notice: Subject to any disclaimer, the term of this patent is extended or adjusted under 35 U.S.C. 154(b) by 428 days.

(21) Appl. No.: 10/624,489

(22) Filed: Jul. 23, 2003

(65) Prior Publication Data

US 2004/0139045 A1 Jul. 15, 2004

(30) Foreign Application Priority Data

Jul. 23, 2002 (CA) .................................. 2394713

(51) Int. Cl.
  G06F 7/00 (2006.01)
  G06F 17/00 (2006.01)
  G06F 3/00 (2006.01)
  G06F 9/00 (2006.01)
(52) U.S. Cl. ...................................... 707/102; 715/854
(58) Field of Classification Search .............. 707/1–10, 707/102; 709/225; 715/500, 854
  See application file for complete search history.

(56) References Cited

U.S. PATENT DOCUMENTS

| 6,569,205 | B1 * | 5/2003 | Poggi ......................... | 715/500 |
| 6,801,910 | B1 * | 10/2004 | Bedell et al. .................. | 707/6 |
| 6,807,518 | B1 * | 10/2004 | Lang ............................. | 703/2 |
| 2002/0087516 | A1 | 7/2002 | Cras et al. | |
| 2003/0208460 | A1 * | 11/2003 | Srikant et al. ................. | 707/1 |

FOREIGN PATENT DOCUMENTS

WO  WO 01/55937 A2  8/2001

OTHER PUBLICATIONS

European Search Report issued by the European Patent Office on June 22, 2006, in Application No. 03016835.5-2201.
"Powerplay Enterprise Server Guide," Cognos Incorporated, Apr. 24, 2002, pp. 57-62, available at http://apsdwh/vlaanderen.be.cognos/help/pes.pdf>.
"Cognos Web page," Jul. 21, 2002, p. 1-1, available at http:/web.archive.org/web/20020721073248/http://cognos.com>.
"Schneider Logistics Uses Cognos global Extranet to Turn Information into Cornpetitive Advantage," May 23, 2002, pp. 1-3, available at http://web/archive.org/web/20020814211035/www.cognos.com/products/solaris_scalability.pdf>.
Hyperion, "The Role of an OLP Server in a Data Warehousing Solution," pp. 1-18, 1998.

(Continued)

Primary Examiner—Hosain Alam
Assistant Examiner—Shew-fen Lin
(74) Attorney, Agent, or Firm—Finnegan, Henderson, Farabow, Garrett & Dunner, L.L.P.

(57) ABSTRACT

The invention, when incorporated in a drill-through modeling tool (DMT), allows all the elements affecting drill-through behavior to be aggregated in a single structure or set of structures, thereby allowing administration to be simplified, and also permitting easier integration with third-party tools. The invention also provides for graphical displays of drill-through paths for a DMT user. These displays show the parameters and dependencies of each drill-through path and allow tool users to obtain a quick overview of the drill-through network and further, they allow the tool user to confirm drill-through dependencies at a glance. Drill-through objects may thus be manipulated and maintained in a graphical manner.

12 Claims, 3 Drawing Sheets

OTHER PUBLICATIONS

Y. Cui et al., "Practical Lineage Tracing in Data Warehouses," Data Engineering 2000 Proceedings, 16th International Conference, San Diego, CA, Feb. 29, 2000 thru Mar. 3, 2000, Los Alamitos, CA, IEEE Comput. Soc., pp. 367-378.

Y. Cui, et al., "Lineage Tracing in a Data Warehousing System," Data Engineering 2000 Proceedings, 16th International Conference, San Diego, CA, IEEE Comput. Soc., Feb. 29, 2000, pp. 683-684.

"Advanced Reporting Guide," Microstrategy 7i Documentation, Apr. 2002, pp. 215-224, available at https://spective.maersk-logistics.com/insecure/help/advancedreporting.pdf.

L. Popa, et al., "Mapping XML and Relational Schemas with Clio," Proceedings 18th International Conference on Data Engineering, San Jose, CA, Feb. 26, 2002, Mar. 1, 2002, International Conference on Data Engineering (ICDE) Los Alamitos, CA, IEEE Comp. Socl, vol. conf. 18, Feb, 26, 2002, pp. 498-499.

"Oracle Warehouse Builder: a Technical Overview," Oracle Technical White Paper, 2000, pp. 1-21.

E. Rham, et al., "a Survey of Approaches to Automatic Schema Matching," VLDB Journal, Springer Verlage, Berlin, Germany, vol. 10, Nov. 21, 2001, pp. 334-350.

\* cited by examiner

STATIC DRILL-THROUGH MODELLING

FIELD OF THE INVENTION

The present invention relates to a method of interactively searching a database in such a manner that it is quick and easy. It is particularly directed to mechanisms that allow applications to present the user with summary information. The present invention also relates to retrieving information from a database based on content aggregation, management and distribution.

BACKGROUND OF THE INVENTION

A key to success in business today is to understand and effectively manage the factors that drive an enterprise—a field known as Business Intelligence (BI). Having critical Information about such business drivers allows decisions that will significantly improve results. As organizations 'flatten', that is, the number of levels in their hierarchies decrease, these mission-critical decisions are being made at lower levels—which means that almost every employee in an enterprise needs quick, easy access to appropriate information. In spite of this necessity, corporate information remains inaccessible for many employees—virtually locked away in data warehouses, data marts, enterprise resource planning systems, and myriad corporate databases.

Early BI systems provided valuable information from these data stores by retrieving transaction-level detail from On-line Transaction Processing (OLTP) databases. This capability relied on Information Technology (IT) specialists building complex queries using languages like SQL. The advent of On-Line Analytical Processing (OLAP), however, has given organizations more effective and meaningful access to critical corporate data. Modern OLAP systems consolidate and present summarized corporate information from a multitude of sources. This technology allows users to view information in a business context: sales per quarter per sales representative, units shipped on time per city per branch by air, and so on. By presenting corporate data so that it is related to the business structure, trends and anomalies can be more easily spotted and addressed.

OLAP reports—interactive reports that are highly formatted, easily deployed, and straightforward to use—deliver value to the entire organization. These reports accelerate the "Eureka moment" by exposing "sweet spots" of information in a data set directly to decision makers, knowledge workers, and information consumers. "Sweet spots" are selective pieces or collections of information that provide decision makers with immediate critical insight into business drivers. These OLAP reports can be regular status reports, but are especially effective for key performance indicator (KPI) reporting, business performance measurement reporting, and scorecard reporting, all of which are becoming increasingly important to decision makers. A robust reporting environment is required in which to perform these tasks.

Products such as PowerPlay™ by Cognos Inc. enable organizations to create and deploy highly formatted, interactive OLAP reports. These reports let users easily measure, manage, and track improvements in business performance. They also allow easy distribution of this information across the enterprise. Decision makers throughout the organization now have the information they need to significantly improve business results.

Because of the complexity of corporate organizations, and their data, it is not unusual for a particular enterprise to deploy several different products to analyze their data. Often these products are from different vendors.

For companies that want to track performance and trends, or perform scorecard-style management reporting (viz.: short, concise, and consistent), there is an even more fundamental concern. It can be extremely difficult to understand "the big picture" when the only accessible reports focus on transaction-level detail, because data in databases is organized for efficient storage and administration, not for summary-level analysis or exploration. In addition, data storage does not correspond to how the business is organized, so data must usually be manipulated and reformatted before the user can extract useful information from it.

If, for example, managers want to explore company performance in terms of product sales, a report that details the performance of individual sale reps will not help them spot overall trends. By reviewing summary information first, such as total sales per office r region, decision makers can more easily gain a "big picture" view of business performance. They can then drill down to lower-level details to uncover what is driving these trends. Thus OLAP technology has brought significant value to business decision making. OLAP systems store and access data as dimensions that represent business factors like time, products, geographical regions, and sales channels. This information is stored "multi-dimensionally"—like a cube that can be viewed, turned, and explored from any angle. The information is also presented in a business context, like 'number of customer complaints by product line in North America last quarter,' rather than a database context—so decision makers have immediate access to the information they need to make the best decisions for the business.

Until recently, organizations have found it difficult to meet some of these user requirements. However, with the advent of OLAP tools enterprise-wide deployment of OLAP reports is now a reality. Cubes can be customized to reflect the dimensions and calculations (also called measures) based on data stored in the original database most commonly used in a given organization. OLAP reports are generated from one or more of these data cubes. Because each cube contains a wide variety of dimensions and measures, a vast number of reports can be built from the information in the cubes. The cubes can be considered as master reports or a collection of components that can be assembled to create a specific report.

With OLAP reports, the users first view of the data is a 'top-level' one that reveals patterns and trends at a glance. If users have identified issues in this summary-level information, OLAP reports enable them to fully explore and analyze the data set from several perspectives or angles, to varying levels of detail. The reports also enable users to 'slice and dice', drill down, drill up, and provide alternative graphical views of their data—something paper reports cannot offer. (The term 'slice and dice' generally implies a systematic reduction of a body of data into smaller parts or views that will yield more information. The term is also used to mean the presentation of information in a variety of different and useful ways.)

OLAP reports that take an analyze-then-query approach allow decision makers to access data the same way they identify and solve problems: by reviewing totals or summary information first then looking at the underlying details by drilling down to transaction-level details whenever necessary.

There are two major stages in implementing a reporting solution. The first step is to create OLAP cubes, the multi-dimensional structures that house summary-level details of the corporate data. Typically, these cubes are created by IT specialists and deployed to information analysts and report authors. The cubes are customized models of a business that reflect the unique characteristics of the company. The structure of a cube is defined in terms of dimensions and measures. Dimensions are hierarchical categories of information like time, products, and geography. For example, the product dimension hierarchy may be organized by product line, product group, and then by individual product. Measures are the (results of) calculations based on the original data that are used to track the business such as revenue, units sold, and cost of sales. In other words, measures are the numeric columns that present the count or summation of particular values that users would like to see in their reports.

OLAP cubes generally contain only the dimensions and measures relevant to a specific analysis. For example, sales analysis data and human resources data would be housed in separate cubes. This ensures that cubes remain manageable, not just in terms of their size but also in terms of the clarity of the information they contain. With appropriate tools, diverse but compatible cubes can be easily linked together so that users can move effortlessly from one cube to another, accessing information from all areas of the company.

Once OLAP cubes are created and deployed, report authors have everything they need to produce a wealth of OLAP reports. The process for authoring is extremely straightforward for all types of reports; status reports that reveal a snapshot of data; ad hoc reports that answer specific questions; and business performance management reports that track KPIs (Key Performance Indicators).

Although OLAP reports can be distributed on paper, it is well known that decision makers reap the most value when the reports are presented electronically. There are typically three ways to explore data in an OLAP report:

Drill down/Drill up: Users can explore a dimension hierarchically moving from summary-level information to the details and back—to gain fast answers to critical business questions. A financial manager who is concerned with rising expenses will want to understand what parts of the company are particularly problematic, By drilling down on a geographical dimension, they can move from looking at expenses by country, by region, by office and then finally by department. Drilling up is the reverse process, so that the information becomes more summarized, and less detailed.

Drill-through and 'Slice and dice': Decision makers can interactively explore corporate data in any combination of dimensions, from many different angles or perspectives. For example, a sales manager can look at revenue figures by product line, sales region, time period, or sales channel.

Graphical analysis: Users can choose from a variety of graphical displays with which to depict the key factors that are driving the business and assist them in understanding the performance of various aspects of the business.

In typical BI products the information defining the mapping of source and target drill-through objects is spread over several report generating applications, sometimes obtained from different vendors, and uses data also provided by different products, sometimes also from different vendors. This makes administration difficult since changing drill-through behavior requires the administrator to apply the changes to more than one report generating application. It also means that it is very difficult to deploy or assess dependencies for drill-through installations.

Another problem is that drill-through definitions are either saved in cubes or saved in report definitions, so that when a change is made, such as a report being deleted or modified, it is very hard for the administrator to determine what cubes or other reports are dependent on the report that is being deleted or modified (i.e. are possible drill-through targets).

Further, drill-through objects are somewhat "closed in" or concealed, that is, unintentionally, but effectively, hidden from external applications, so that it is difficult for third party applications to fully utilize them. The fact that the data describing a particular drill-through (the drill-through metadata) might be distributed over several sources means that it is also difficult to integrate it with such third-party applications. Additionally, each of these applications likely has different data format requirements.

SUMMARY OF THE INVENTION

The present invention, particularly when incorporated in a drill-through modeling tool, solves or alleviates the above-mentioned problems, as well as providing several other advantages as will be made clear in the following description.

According to one aspect of the invention, there is presented a method of providing a drill-through service between two or more drill-through objects, the objects being drill-through sources and targets, the method comprising steps of defining one or more drill-through paths between drill-through objects, the drill through path definitions being collected in a single structure; interfacing to the drill-through objects in a run-time environment using the collection of drill-though path definitions; and administering and maintaining the drill-through path definitions, independently of applications using them.

Such a DMT also provides graphical displays of drill-through paths for a DMT user or modeller. These displays show the parameters and dependencies of each drill-through path and allow users to obtain a quick overview of the drill-through network and further, they allow the tool user or modeller to confirm drill-through dependencies at a glance. Drill-through objects may thus be manipulated and maintained in a graphical manner.

A further understanding of other aspects, features and advantages of the present invention will be realized by reference to the following description, appended claims, and accompanying drawings.

BRIEF DESCRIPTION OF THE DRAWINGS

Preferred embodiments of the present invention will be described with reference to the accompanying drawings, in which.

DETAILED DESCRIPTION PREFERRED EMBODIMENTS

Figure 1:
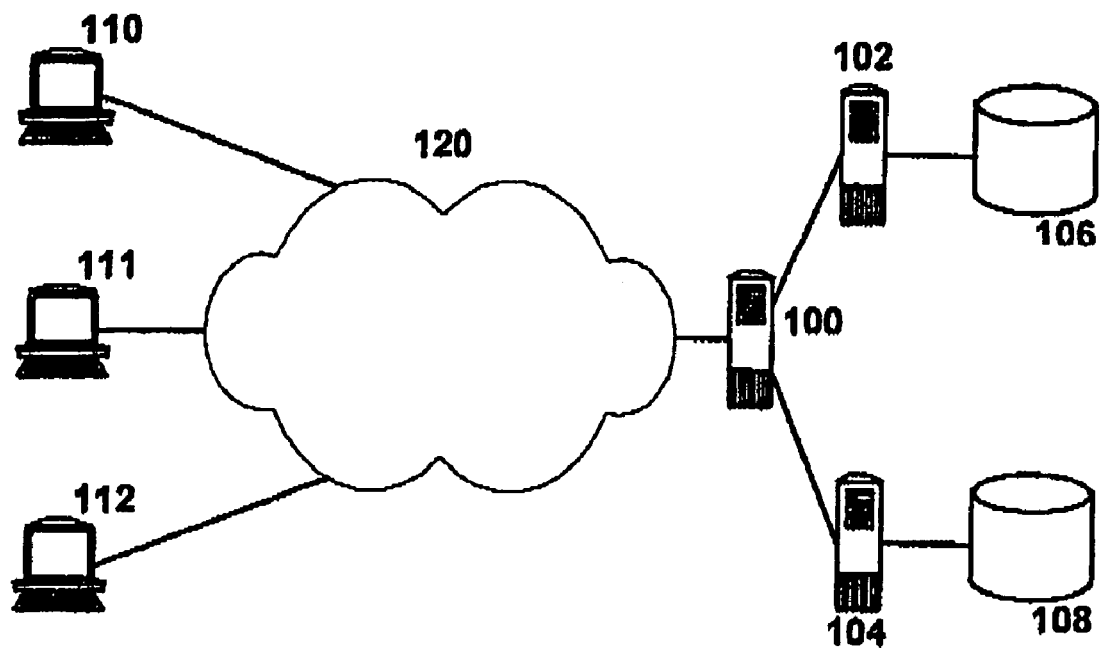
FIG. 1 shows the computer and related systems and network within which an embodiment of the invention may be practiced.

Typically, the invention is practiced within a network of computers and related equipment, an example of which is illustrated in FIG. 1. The data are stored in a data warehouse comprising files servers 100, 102, 104 and storage devices 106, 108. The file servers 100, 102, 104 contain one or more software report generating applications (not shown), including modeling and administration tools using these data. The file servers 100, 102, 104 are accessed from workstations 110, 111, 112 over a network 120 which may be an intranet, Internet, or any other arbitrary network topology. The workstations 110, 111, 112 may also contain application software (not shown).

In at least one preferred embodiment, a business modeling tool (BMT) framework is enhanced with a drill-through path administration tool that allows the tool user or modeler to design a single drill-through solution comprising all of the metadata for drill-through sources and targets for an entire suite of business data analysis products, or in some cases a set of otherwise independent business data analysis products. The drill-through metadata is that information necessary to describe all of the required or identified drill-through objects and their paths. Other embodiments permit access to this information (i.e. the drill-through metadata) to be extended to external applications as well. Yet further embodiments permit the data accessed by the drill-through paths to be resident outside of the data warehouse. For example, historical commodity prices might reside on a well-known Hypertext markup language (HTML) server attached to and accessed via the Internet.

In describing the invention, it is helpful to understand how the BMT and the drill-through service relate to the user of the data (who ultimately does the interpretation and analysis of that data) and to the report generating applications available, as well as to the data itself. The drill-through solution may be considered as being implemented in two parts. The first part is the drill-through modeling tool that is used in performing the task of defining drill-through paths between various source and target objects. That is, metadata for a set of drill-through paths are defined and definitions of the drill-through paths are aggregated at a single point and stored in a single structure or set of structures. The second part is the runtime environment that comprises those drill-through services and queries used by report generating applications, i.e. interfacing the meta-data to various data collections, such as data cubes or data-based reports, which are derived from different report generating applications.

Figure 2A:
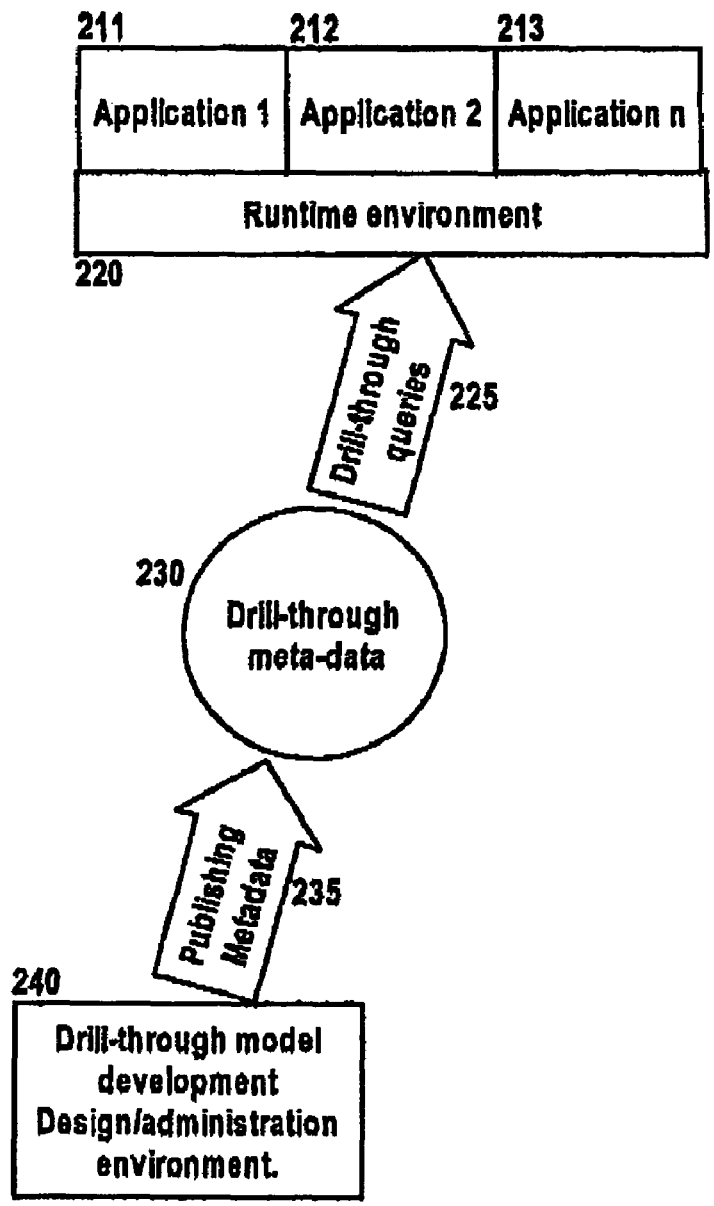
FIGS. 2*a* and 2*b* show two aspects of the relationships between the data, the data modeling tool, the dill-through path metadata, and the report generating applications.

These parts are shown in FIG. 2a where various report generating applications, 211, 212, and 213 make use of a runtime environment 220 to access metadata that defines valid drill-through path options using drill-through queries 225 on information stored as drill-through metadata 230. The drill-through path metadata 230 is published through a series of interactions 235 by the modeling environment 240. To reduce complexity of the FIG. 2a the common sources of data for the modeling and runtime environments are not shown.

Figure 2B:
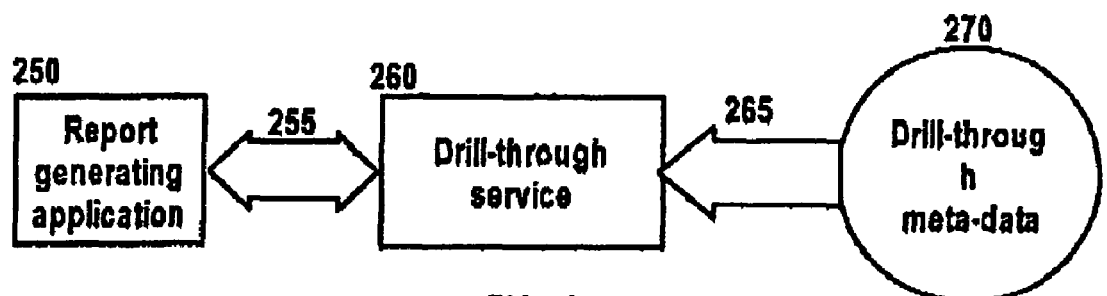

FIG. 2b shows in more detail the mechanism for accessing the drill-through path metadata 270 from a typical report generating application 250, by making use of a drill-through service 260. When a drill-through path is determined to be required by the application 250, under the control of a user (not shown) one or more queries through an application program interface API 255 are made of the drill-through service 250. The drill through service 260 reads through a further API 265 the drill-through metadata 270 in the course of responding to the one or more queries 255. Examples of queries that report generating applications 250 (including those available from Business Objects SA, Cognos Corporation, or Oracle Corporation) might issue through the API are:

Generate a list of potential drill-through targets for a specified report (source).

Generate a target report for a specified target and context information (where an example of the context information is a row of data from the report).

Figure 3:
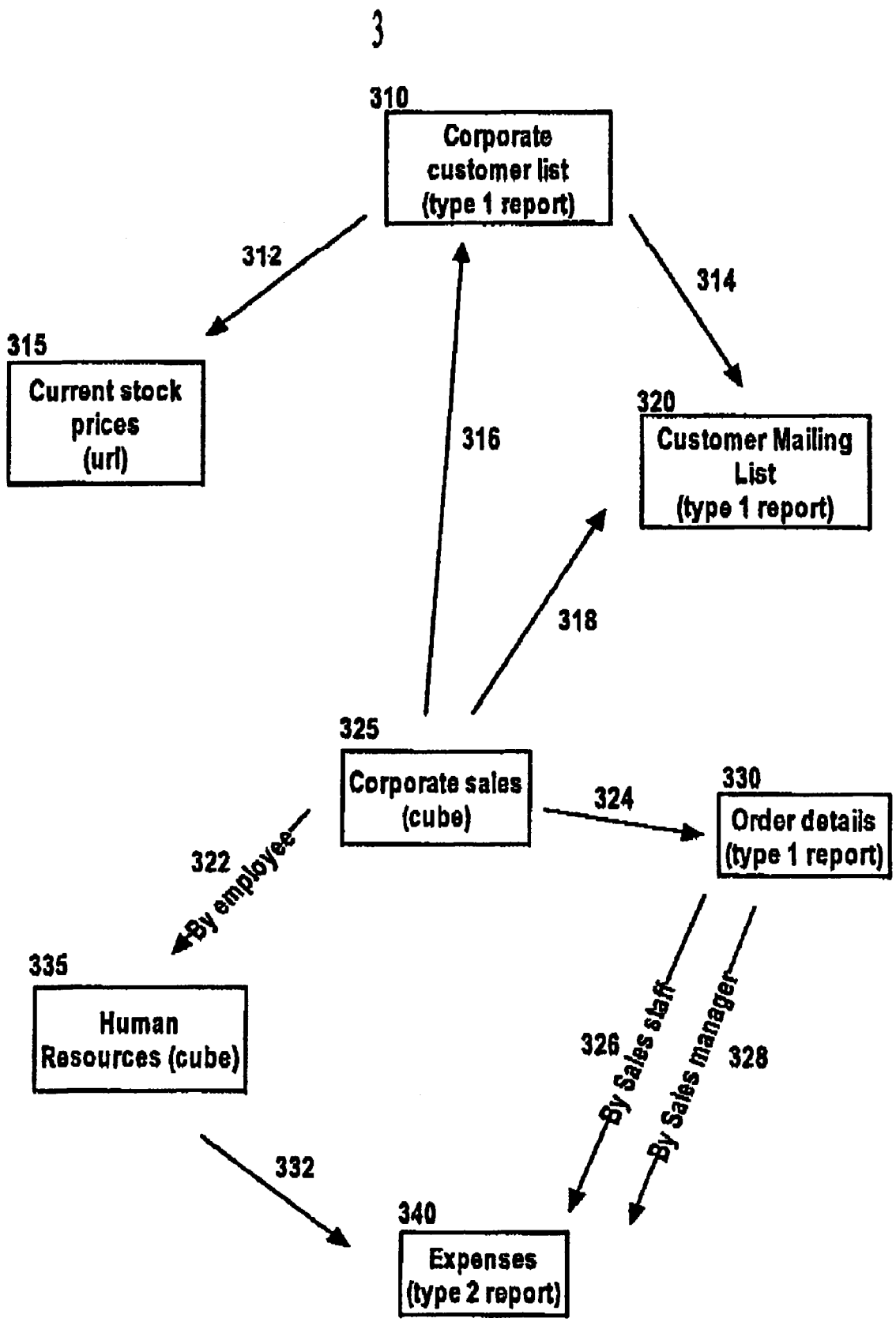
FIG. 3 shows an example of drill-through network in which an embodiment of the invention may be used.

FIG. 3 shows a representative example of a drill-through relationship network that might be displayed in a diagram view within the BMT. Referring to FIG. 3, all drill-through sources and targets are represented as nodes. Any node may be associated with any other node by means of a drill-through path, shown diagrammatically as an arrow between the relevant nodes. This particular example shows a number of reports generated by different report generating applications. The type 1 reports Corporate Customer List 310, Customer Mailing List 320, and Order Details 330, and the type 2 report Expenses 340 are differentiated in that they are typically derived from separate report generating applications. In turn, these separate report generating applications may typically derive their data from different types of source (for example OLAP sources and relational database sources). In addition, there are two cubes, Corporate Sales 325, and Human Resources 335, derived from corporate data sources. One 'external' source of information is also shown, Current Stock Prices 315, where the reference is made via an Internet Uniform Resource Locator (URL). A number of drill-through paths are identified, 312, 314, 316, 318, 322, 324, 326, 328 in which the arrowheads designate the direction of the drill-through. A list of drill-through targets that is maintained within the drill-through service 260 of FIG. 2b is presented by the report generating application 250 of FIG. 2b either using the drill-through path names or the target names. The drill-through paths made available to the user by the report generating application are identified by the tool user or by a modeller, or optionally by an automatic internal process. If there is more than one path to a drill-through target then it is the designers responsibility to provide meaningful dill-through path names to assist the tool user in choosing correctly. Assigning these drill-through path names is optional. By way of example, paths 322, 328, 328 have names assigned to them as follows: "By Employee" 322, "By Sales state" 326 and "By Sales manager" 328. In cases where there are multiple drill-through paths to a single target and the drill-through paths do not have names assigned to them, the user of the report generating application, when presented with a drill-through target list dialogue, would see duplicate entries, one for each path.

It should be noted that in some cases a drill-through path might be defined between two reports, such as 314, where the drill-through path extends from one report, Corporate Customer list 310, to another report, Customer Mailing list 320. In other cases, more than one drill-through path 326, 328 is defined between two nodes, for example, between the Order Details report 330 and Fe expense report 340. There are no limits on connectivity of the drill-through paths, as long as they are logically correct—the selection of such paths is part of the drill-through designer's task.

Adding drill-through source and targets is similar to an import action. It will be apparent that the details of the process of adding a drill-through object (source or target) are specific to the type of object.

The following are the steps performed in one preferred embodiment to add (or import) a drill-through object:

1—locate and open the object
2—determine what parameters could be used as outputs and what parameters could be part of the drill-through predicate (or search condition).
3—determine the parameters that could be used as inputs to the drill-through object. For example, report columns, dimension levels, or prompts.

4—determine application-specific information, if any.

5—create the drill-through object in the drill-through metadata structure.

Inputs to a report using drill-through objects can be anything that will act as a valid filter to the report. The provision of the ability to drill through from one report to another, (or more generally from one document to another), allows the user to switch rapidly from that first document/report to another relevant document/report, while retaining some of the content of the first report/document.

By way of example, we can consider a simple situation in which a report has been defined that describes a product line of stoves (e.g. model#, colour, price). The user wishes to open another report that describes sales information (date, totalSales), and to do so using the attribute 'colour' to relate the two reports. Even though none of the columns in the reports match, and the reports therefore do not seem to be related, the definition of an appropriate join (i.e including colour) between the tables that are used in creating both reports (by mechanisms outside of this invention and discussion), means that colour can be applied to the target report as a filter using the drill-through path. In this case the list of parameters used as an input to the drill-through path is: report columns, dimension levels, prompts and columns from other tables that have one or more joins to tables referenced in the report (columns from associated tables).

It is in cases such as this one that the ability to define and maintain drill-through paths provides significant benefit since none of the reports involved need be kept informed of changes to the relationships of the underlying data, but rather, only the drill-through paths need be kept up to date. All of the reports dependent on the underlying data remain valid, resulting in a much reduced maintenance burden.

In preferred embodiments of the invention the tool user is requested to provide the location of the object that is to be imported (such as a report) by creating a drill-through path. One mechanism to achieve this is by the use of a graphical interface where the source and the target are associated with a line on a graphical representation of the system. Using such a mechanism, a dialog box is then displayed which includes the source and target parameters in list boxes". The tool user can "match up" the parameters by selecting equivalent (or corresponding) pairs of parameters for the source and target from these list boxes. The editing of the drill-through paths with the selection of appropriate parameters may optionally employ a form of dialog or wizard appropriate to the users competence. Optionally, the tool user may add parameter-mapping functions, where appropriate, using similar "list box" tools or their equivalent.

In one preferred embodiment the drill-through modeling tool, after adding (or importing) the object, automatically determines the possible drill-through paths by examining the parameters of the imported object. It then attempts to find parameters that match with parameters of other drill-through objects. This list of potential drill-through paths is then presented to the tool user or modeller in a manner allowing the selection of one or more desired drill-through paths.

In further preferred embodiments the adding process includes a feature to attempt to determine the physical source on which a parameter is based. This is carried out automatically and the resultant matches are presented as a list. The tool user then selects or deselects the matches from those presented. In these embodiments, if the source and target parameter names do not match exactly then other information regarding the parameters is used as a clue as to which source and target parameters match. For example a parameter may represent a report column where that column is based on a database column. The reference to that database column is saved and used as a clue or 'hint' to assist the tool user when trying to establish a mapping from a parameter from one drill-object source to target. As before, the tool user selects or deselects from a list to make a selection.

Typically, drill-through objects (source and targets) have their implementation-specific actions encapsulated within a dynamically shared library, within what are known as plug-ins. Alternatively, the objects and their actions may form a module in a program library. Each plug-in or module is responsible for at least the following functions:

Importing (or adding), which is the act of determining the parameters required to define the drill-through object.

Providing the actions and logic that the drill-through service needs to send either to perform the drill-through action or to return the required data to the calling client of the drill-through service. When the drill-through service is queried and asked for a list of targets based on a drill-through predicate (or search condition) and its source, the drill-through server responds with a list of targets plus other associated information (such as a URL). The inclusion of a URL means that the client making the query could, based on the response, 'launch' the URL, thereby accessing the data contained in the referred-to location. The drill-through service also has actions that can be invoked by the client when it is required to perform the action on behalf of the client. Typically, the drill-through service invokes the URL (for example by sending back a redirect HTML page to the client's browser). The plug-in specific to the drill-through target determines which action is performed. In some embodiments, the action queries one or more third party databases or applications (or more strictly the data or reports associated with or generated by the applications).

Validating (when invoked by the modeling application), the existence of the target and confirming that the parameter and other properties still apply/exist.

Optionally translating and/or reformatting of data between any two compatible applications.

The use of a plug-in, or an equivalent program library, means the metadata for each drill-through path is stored in a single place or structure, in a fixed and defined format, thereby simplifying the updating of such drill-through paths, and further simplifying the disclosure and publication of APIs and their related drill-through path metadata for the use of third-party applications if necessary.

While various preferred embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer-based drill-through path administration method for use in a framework having a plurality of drill-through sources and drill-through targets, the method comprising steps of:

a) defining the drill-through sources and targets at least in part by a metadata, the metadata at a single point, describing drill-through objects and valid drill-through paths using data structures;

b) displaying the drill-through sources and targets;

c) accepting from a tool user an indication of the drill-through sources and targets for which a drill-through path is required; and d) for each source for which a drill-through path is required;
   i) importing the source;
   ii) for each drill-through path, associating the drill-through source and target using the metadata;
   iii) collecting the drill-through path in a data structure;
   iv) accepting from a tool user an indication to select one or more drill-through paths in the data structure;
   v) accepting from a tool user an indication to edit the selected drill-through paths to select appropriate parameters; and
   vi) encapsulating the selected drill-through paths in a program library;

wherein the step of accepting from a tool user an indication of the drill-through sources and targets for which a drill-through path is required uses a graphical user interface whereon the tool user draws lines connecting nodes representing the drill-through source and target for the drill-through path.

2. The drill-through path administration method of claim 1, wherein the step of associating comprises the step of determining automatically the drill-through paths for the required sources and targets, the step of determining comprising the steps of:
   a) comparing the source and target parameter names of the drill-through source and target;
   b) if the source and target parameter names match, then establishing a mapping between the source and target parameters; and
   c) if the source and target parameter names do not match then performing the steps of:
      i) searching for other information regarding the parameters which match and establishing one or more preliminary mappings between the source and target;
      ii) presenting a tool user with a list of the one or more preliminary mappings from which to make a selection;
      iii) accepting from a tool user an indication to select from the list of the one or more preliminary mappings; and
      iv) adding the selected preliminary mappings to the list of mappings established by matching parameter names.

3. The drill-through path administration method of claim 1, wherein the program library is an entity selected from the group consisting of dynamically shared library, and plug-in.

4. The drill-through path administration method of claim 1, wherein the source comprises one or more databases or applications provided by a third party.

5. A computer-based drill-through path administration system for use within a computer-based business modeling tool having a framework comprising drill-through sources and drill-through targets, the drill-through path administration system comprising:
   a) means for defining the drill-through sources and targets at least in part by a metadata, the metadata at a single point, describing drill-through objects and valid drill-through paths using data structures;
   b) means for displaying the drill-through path sources and targets;
   c) means for accepting from a tool user an indication of the drill-through sources and targets for which a drill-through path is required;
   d) means for importing the source for each source for which a drill-through path is required;
   e) means for associating the drill-through source and target using the metadata, f) collecting the drill-through path in a data structure;
   g) means for accepting from a tool user an indication to select one or more drill-through paths in the data structure;
   h) means for editing the selected drill-through paths to allow a tool user to select appropriate parameters; and
   i) means for encapsulating the selected drill-through paths in a program library;

wherein the means for accepting from a tool user an indication of the drill-through sources and targets for which a drill-through path is required uses a graphical user interface whereon the tool user draws lines connecting nodes representing the drill-through source and target for the drill-through path.

6. The drill-through path administration system of claim 5, wherein the means for associating includes means for determining automatically the drill-through paths for the required sources and targets, the means for determining comprising:
   a) means for comparing the source and target parameter names of the drill-through source and target;
   b) means for establishing a mapping between the matching source and target parameters;
   c) means for searching for information for non-matching source and target parameter names regarding other parameters which match and establishing one or more preliminary mappings between the non-matching source and target;
   d) means for presenting a tool user with a list of the one or more preliminary mappings between the non-matching source and target from which to make a selection;
   e) means for accepting from a tool user an indication to select from the list of the one or more preliminary mappings; and
   f) means for adding the selected preliminary mappings to the list of the one or more preliminary mappings established by matching parameter names.

7. The drill-through path administration system of claim 5, wherein the program library is an entity selected from the group consisting of dynamically shared library and plug-in.

8. The drill-through path administration system of claim 5, wherein the source comprises one or more databases or applications provided by a third party.

9. The drill-through path administration method of claim 1, further including the step of:
   accepting from a tool user an indication to edit the selected drill-through paths to add parameter mapping functions.

10. The drill-through path administration method of claim 9, wherein the step of encapsulating includes the step of encapsulating the selected and edited one or more drill-through paths in the program library.

11. The drill-through path administration system of claim 5, further including:
   means for accepting from a tool user an indication to edit the selected drill-through paths to add parameter mapping functions.

12. The drill-through path administration system of claim 11, wherein the means for encapsulating includes means for encapsulating the selected and edited drill-through paths in the program library.

* * * * *